T. BARTHOLOMEW.
PIPE COUPLING SEAL.
APPLICATION FILED AUG. 9, 1913.

1,112,189.

Patented Sept. 29, 1914.

Thomas Bartholomew, Inventor

UNITED STATES PATENT OFFICE.

THOMAS BARTHOLOMEW, OF COLUMBUS, OHIO, ASSIGNOR TO MICHAEL A. CORBETT, OF COLUMBUS, OHIO.

PIPE-COUPLING SEAL.

1,112,189.  Specification of Letters Patent.  Patented Sept. 29, 1914.

Application filed August 9, 1913. Serial No. 783,904.

*To all whom it may concern:*

Be it known that I, THOMAS BARTHOLOMEW, a citizen of the United States, residing at Columbus, in the county of Franklin and State of Ohio, have invented certain new and useful Improvements in Pipe-Coupling Seals, of which the following is a specification.

My invention relates to seals of the type that may be advantageously used for locking two separable members together, as for instance, the lids of boxes or bread baskets, car doors, electric or gas meters, protective guards for pipe couplings, etc.

My invention resides primarily in the provision of a seal of this type comprising complemental parts which are structurally identical. It will be apparent that there are a number of advantages resulting from this construction, such as cost of manufacture and the readiness with which they may be mounted in position.

Another object of my invention resides in so constructing the complemental members forming my seal, that the same may be held together by a peculiarly constructed frangible key.

For the purpose of clearly illustrating my invention, I have shown the same applied to a protective device for pipe couplings or unions, such as are used to join the meeting ends of pipes from the meter and the street main respectively.

Figure 1:
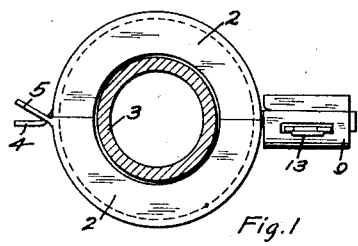
Figure 4:
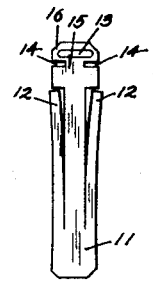
Figure 2:
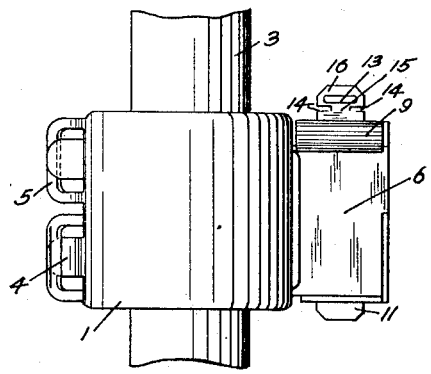
Figure 3:
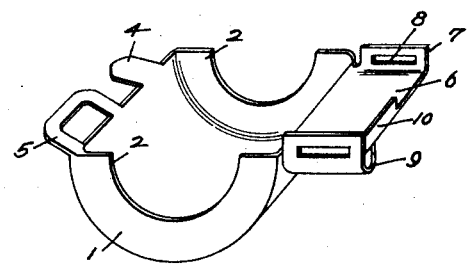

Throughout the several views, like references apply to like parts and Figure 1 is an end elevation of this type of structure with my invention applied, Fig. 2 is a plan view of the structure shown in Fig. 1, Fig. 3 is a view in perspective of one of the protective members carrying a portion of my seal, and, Fig. 4 is a detail view of a peculiar type of locking key used by me.

In the drawings, I have shown the protective device for pipe couplings, as comprising complemental semi-cylindrical members 1, each having inwardly projecting end shoulders 2, whereby longitudinal movement of the device, as a whole, when applied to a pipe 3, shown in section in Fig. 1, is prevented. Each of these sections 1 is also provided with a hook 4 and eye 5, these being definitely located so that they will be in a position to interlock when the two sections are in superimposed relation. Along the opposite edge of each of the sections 1, I have attached my seal, the same comprising complemental members 6 projecting outwardly and having upturned legs 7 slotted as at 8, upon each end. Adjacent one end, each extension 6 is also provided with a pocket formation 9, preferably stamped therein, to receive one of the legs 7 of the opposite member and in this manner will prevent shifting of the superimposed member out of its true position, as well as providing guiding or locking means when the two members are brought together. The forward edge of each extension 6 is also provided with an integral upstanding portion 10 of approximately half the length of such edge, thereby being so positioned to form an inclosure when the two sections are in their operative position. In this manner, tampering with the locking means to be presently described, is precluded by the entrance of a tool, etc., at this point of the seal.

In order to securely lock two sections together, no matter in what connection they may be used, I provide the peculiar type of frangible locking key, shown in detail in Fig. 4. This locking key is adapted for insertion through the registering slots 8 when the two members 6 are in their operative positions. This key comprises a body portion 11 having resilient wing formations 12 formed by cutting a portion of the body, as indicated, with a sharp edged tool. It will be understood that insertion of the key 11 through the registering slots 8, will force these wing formations inwardly until they pass within the housing formed by the coöperating member 6. At this point, the wing formations will again spring laterally and prevent removal of the key in a reverse direction. However, to guard against removal of the key in the opposite direction, I have provided a struck-up or raised portion 13 of a sufficient height to prevent its entrance through the slotted portions. It will, therefore, be readily apparent that tampering with any device fitted with my seal when using this type of key, will be prevented unless the key is broken. Under certain conditions, an authorized person is oftentimes instructed to open devices so sealed and to provide for such contingency, I have formed the key 11 with cut-out portions 14 leaving only a small portion of the body metal as shown at 15. It is a comparatively simple matter to grasp the protruding end 16 with a pair of pliers and break the key along the line of the slots 14, thus removing the struck-up portion 13 and permitting the ready separation of whatever may be held by the two members 6. It is believed the advantages resulting from this peculiar construction will be readily apparent.

What I claim, is:

1. A seal for locking two separable members comprising complemental body members, depending slotted legs on opposite ends of both of said members, and a frangible locking key for insertion through the slots of both members.

2. A seal for locking two separable members comprising complemental interchangeable body members, depending slotted legs on opposite ends of both of said members, and a frangible locking key for insertion through the slots of both members.

3. A seal for locking two separable members comprising complemental interchangeable body members, depending slotted legs on opposite ends of both of said members, a depending leg on the side of both of said members of approximately half the length of each of said body members, and a frangible locking key for insertion through the slots of both members.

4. A seal for locking two separable members comprising complemental body members, depending slotted legs on opposite ends of both of said members, a U-shaped pocket formed in one end of each of said members adapted to receive the opposing depending leg, a depending leg on the side of both of said members approximately half the length of each of said body members, a key body portion adapted for insertion through all of said slots, resilient inner formations carried by said key to prevent its movement in one direction when in operative position through said slots, and a raised portion to prevent its movement in the other direction.

In testimony whereof I affix my signature in presence of two witnesses.

THOMAS BARTHOLOMEW.

Witnesses:
C. C. SHEPHERD,
WALTER E. L. BOCK.

---

Copies of this patent may be obtained for five cents each, by addressing the "Commissioner of Patents, Washington, D. C."